Fig. 2.

No. 752,949. PATENTED FEB. 23, 1904.
J. BLACK & F. J. SMITH.
CAN BODY MACHINE.
APPLICATION FILED MAY 1, 1902.
NO MODEL. 8 SHEETS—SHEET 3.

Fig. 3.

Witnesses.
H. Monteverde.
F. M. Burt.

Inventors
Joseph Black
Frank J. Smith
by Spear & Seely Attys

No. 752,949. PATENTED FEB. 23, 1904.
J. BLACK & F. J. SMITH.
CAN BODY MACHINE.
APPLICATION FILED MAY 1, 1902.
NO MODEL. 8 SHEETS—SHEET 4.

Witnesses.

Inventors
Joseph Black
Frank J. Smith
by Spear & Seely
Attorneys

No. 752,949. PATENTED FEB. 23, 1904.
J. BLACK & F. J. SMITH.
CAN BODY MACHINE.
APPLICATION FILED MAY 1, 1902.
NO MODEL. 8 SHEETS—SHEET 8.

Witnesses.

Inventors
Joseph Black
Frank J. Smith
by Spear Seely Attorneys

No. 752,949. Patented February 23, 1904.

UNITED STATES PATENT OFFICE.

JOSEPH BLACK AND FRANK J. SMITH, OF SAN FRANCISCO, CALIFORNIA.

CAN-BODY MACHINE.

SPECIFICATION forming part of Letters Patent No. 752,949, dated February 23, 1904.

Application filed May 1, 1902. Serial No. 105,547. (No model.)

*To all whom it may concern:*

Be it known that we, JOSEPH BLACK and FRANK J. SMITH, citizens of the United States, residing at San Francisco, in the county of San Francisco and State of California, have invented certain new and useful Improvements in Can-Body Machines, of which the following is a specification.

Our invention relates to the manufacture of sheet-metal ware, and more particularly to the forming of sheet-metal can-bodies and the subsequent soldering of the side seams of such bodies.

Our improvements in machines of this character, designed to simplify their construction and at the same time to produce a rapid, effective, and accurate machine of marked commercial economy, relate to the feeding devices for blanks and for can-bodies, to the hook-bending mechanism, to the interlocking and seam-clenching mechanism, to the soldering mechanism itself, and to its combination with the body supporting and guiding devices, and also to details in the construction of the whole machine, all hereinafter described, and shown in the accompanying drawings, in connection with which this specification should be read.

In the drawings, Fig. 2 is a front elevation.

Figures 1, 19, 20:
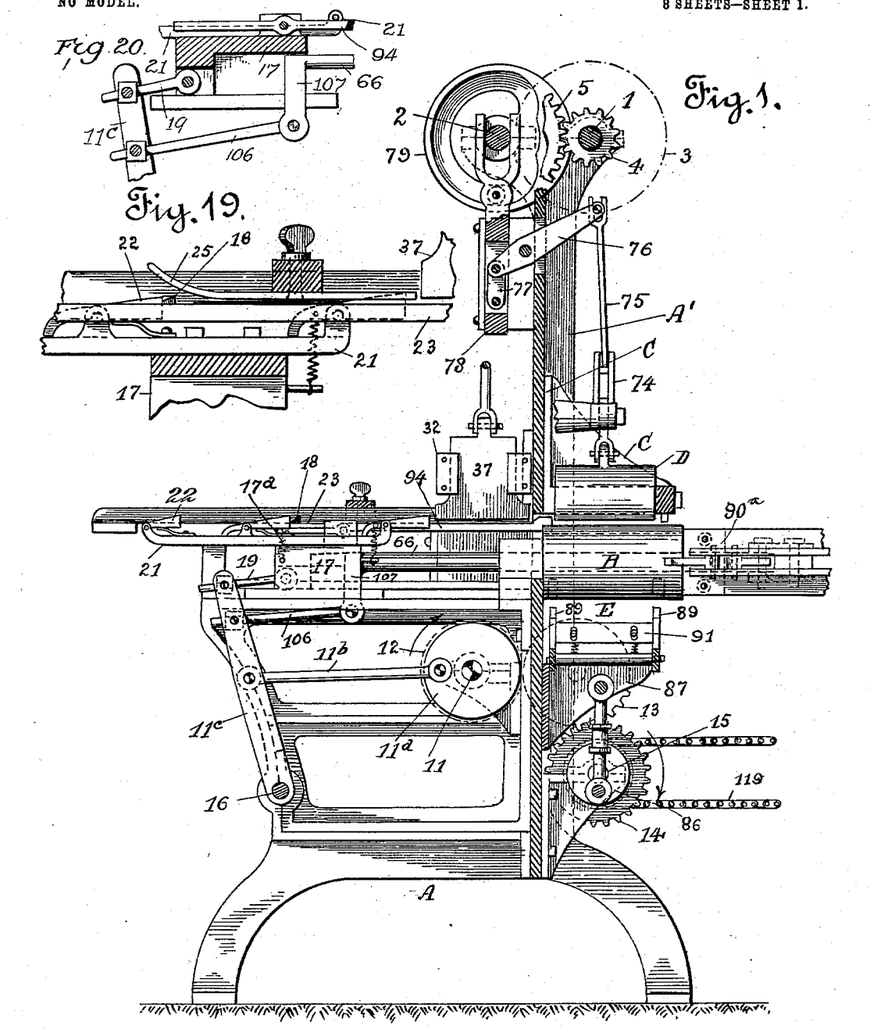
Figure 1 is a sectional side elevation of that portion of the machine which includes the body-forming and side-seam-closing mechanism.
Fig. 19 is a detailed longitudinal section to illustrate the said blank-feeding mechanism.
Fig. 20 is a detail view of independent slides for communicating movements of different lengths to the blank-carriers and the can-body carriers.
Figure 13:
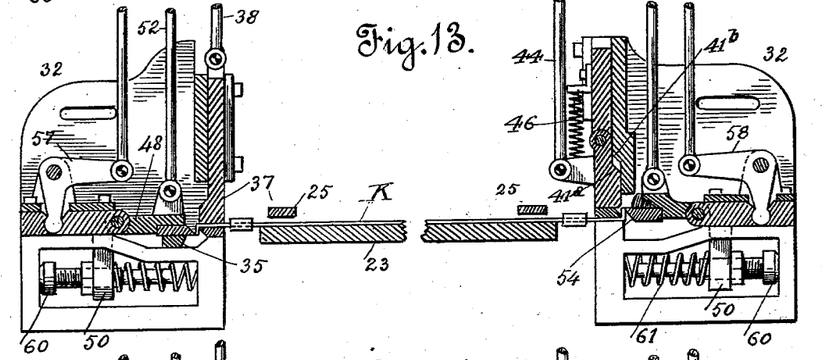
Figure 14:
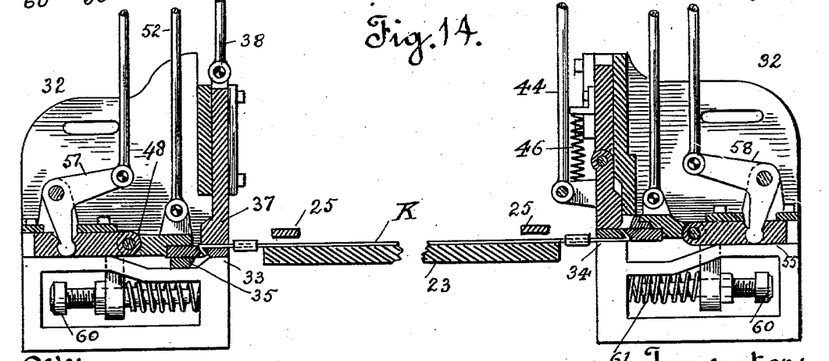

Referring first to Fig. 1, A represents a suitable frame, the top part A' of which carries the driving-shaft 1 and a cam-shaft 2. The driving-shaft has a power-pulley 3 and a spur-pinion 4, the latter through the spur-gear 5 driving the cam-shaft 2, which through the bevel-gears 6, 7, 8, and 9 and vertical shaft 10 drives the horizontal shaft 11, Figs. 1 and 2. Shaft 11 carries a spur-gear 12, which engages the intermediate spur-gear 13, Figs. 1 and 3, which in turn engages driving-gear 14 on horizontal crank-shaft 15, Figs. 2 and 3. The shaft 11 also carries a crank-disk 11$^a$, from which a connecting-rod 11$^b$ extends to the oscillating lever 11$^c$, pivoted at its lower end to or with the shaft 16. From the oscillation of this lever are derived the feeding movements of the machine both for blanks and for can-bodies. A slide 17, working in guides in the horizontal part of frame A, is connected by a rod 19 with the lever 11$^c$ and has two side bars 21, to which are pivoted the spring-pressed carriers 22, which project up on each side of the feed-table 23. The blanks are successively placed upon the feed-table and are carried forward intermittingly by the reciprocation of the carriers, which yield downwardly on each return stroke, an adjustable plate or connected series of bars 25, Figs. 18 and 19, holding the blanks in place. A projection 18 on the top side of table keeps the blank from slipping back after having once passed it. The intermediate carriers of the series 22 push the blank into position for forming the hooks on the edges, which are afterward united into a side seam. The blanks are so held and the forming devices so operated that hooks of exact size and shape are made, which afterward form a perfect seam. For this part of the device reference is made to Figs. 1, 2, and 4 in connection with Figs. 12, 13, and 14. Shaft 2, Figs. 1, 2, 3, carries a series of seven cams, three on each side being adjustable on the shaft to and from the center and properly keyed and set-screwed.

Figure 2:
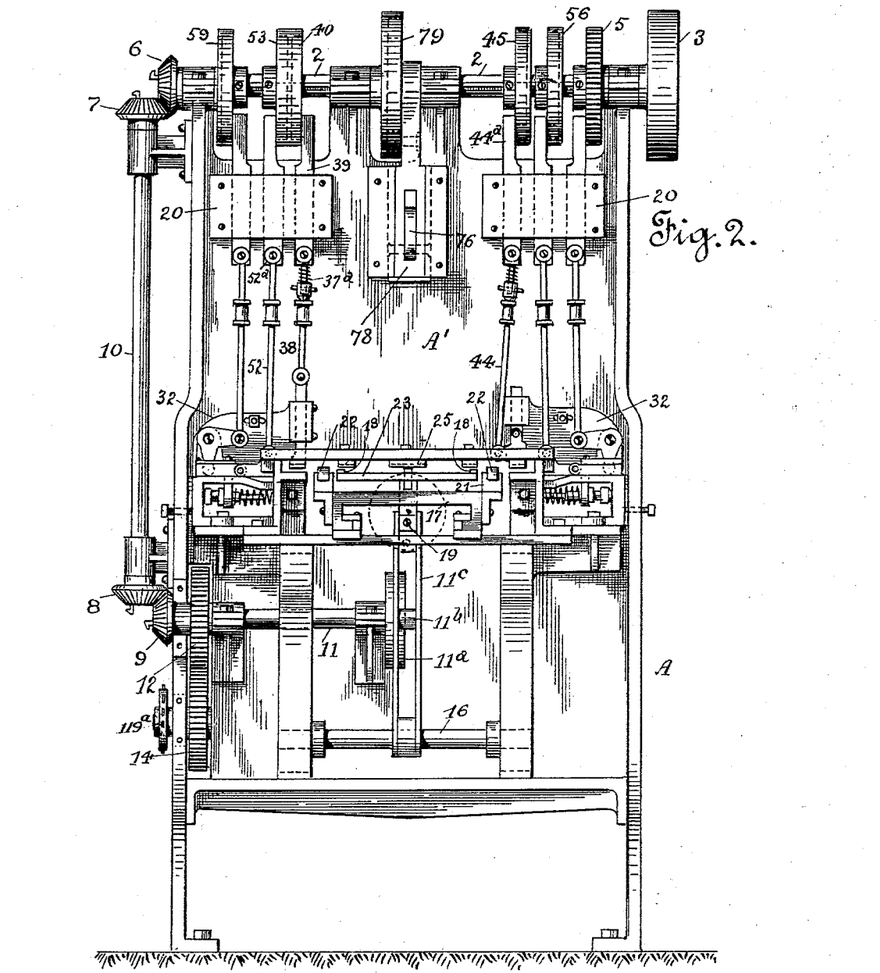
Figure 3:
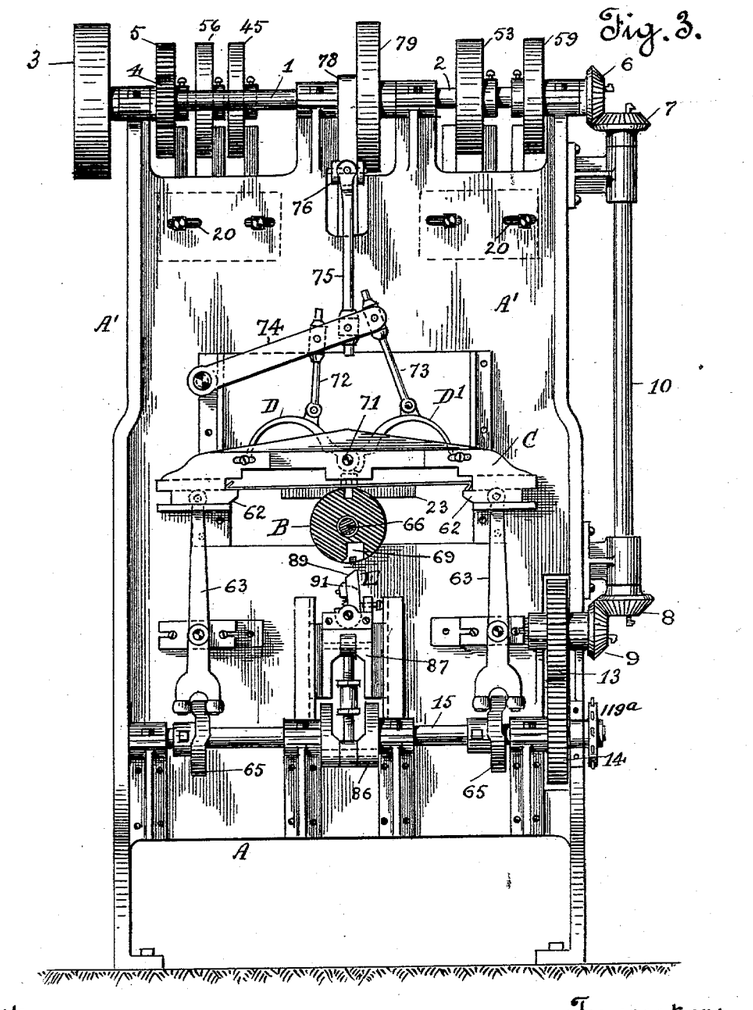
Fig. 3 is a rear elevation, of the same portion of the machine.
Figure 4:
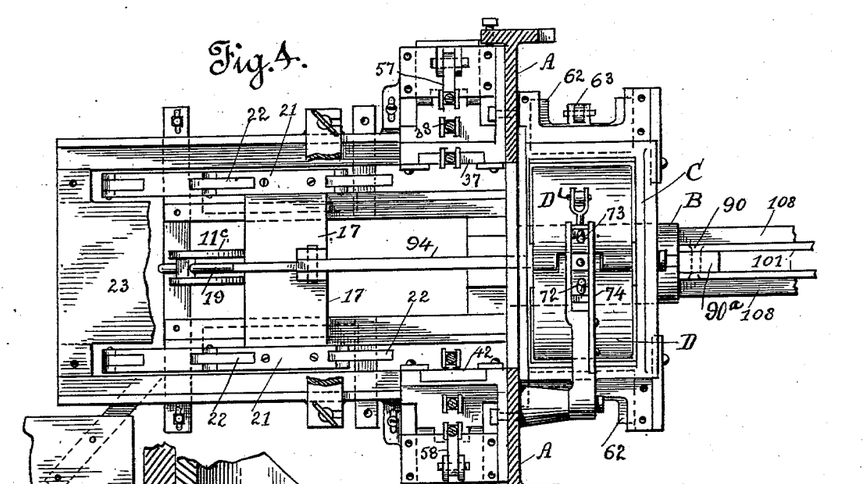
Fig. 4 is a plan view of the same.
Figure 12:
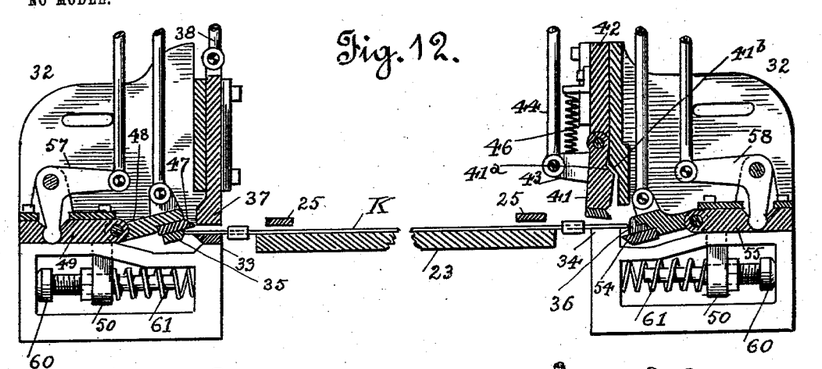
Figs. 12, 13, and 14 are cross-sections of the hook-forming mechanism in successive positions.
Figure 15:
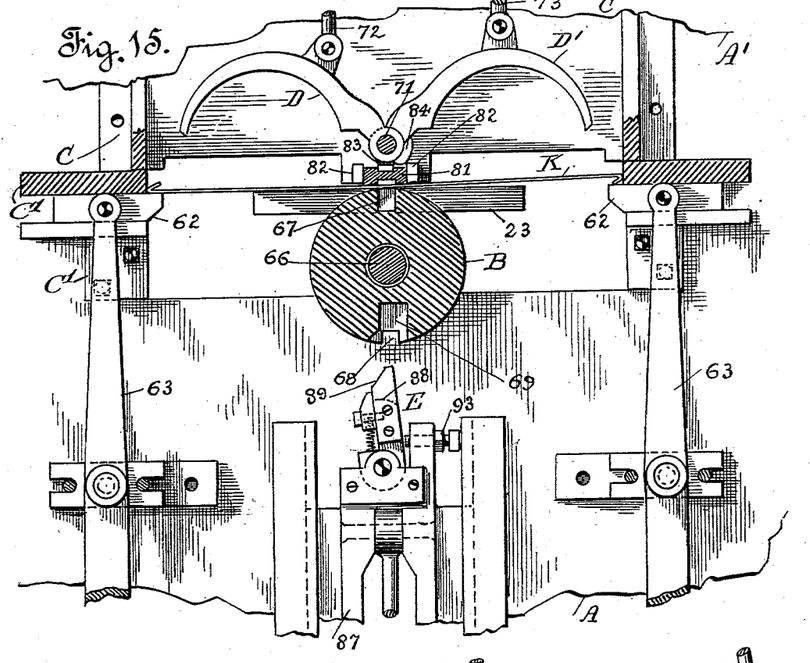
Figs. 15, 16, and 17 are views of the seam-closing mechanism in successive positions.

These cams give intermittent movements to slides, whose guides 20 are also adjustable to and from the center, Figs. 2 and 3, and to which are pivoted adjustable connecting-rods, whose opposite ends are connected with the hook-bending devices. Adjustably secured to the front of the frame A' and near each side thereof is an adjustable bracket 32, which supports the hook-forming mechanism. The latter consists of a peculiar series of dies, the operation of which will be clearly understood from Figs. 12, 13, and 14. The simple form of these dies enables us to use hardened steel on all the points coming in contact with the tin, thus greatly increasing the durability of the machine. In Fig. 12 the blank K has been placed by the intermediate carriers of the series 22 in position to be operated upon. Its edges project sidewise beyond the table and rest upon flat surfaces 33 34. They extend beyond such surfaces by the width of the hooks to be formed and into contact with the gages 35 36, which prevent them from moving sidewise. On the side of the machine where the hook is bent down is a vertically-sliding presser-foot 37, having a direct adjustable connection, which includes a relieving-spring $37^a$, through a rod 38 and slide 39 to the cam 40. The relieving-spring permits the connection to yield should two blanks be accidentally fed together. On the other side there is also a presser-foot 41; but this is hinged to the vertical slide 42 and has a projection 43, from which an adjustable connecting-rod 44, which also includes a relieving-spring and slide $44^a$, extends to the cam 45. A pressure-spring 46 tends to keep parts 41 and 42 in line, Fig. 12. The reason for this difference in connection will be presently explained. Referring now to the left side of Fig. 12, one bending-die 47, having an upper-face right-hand bevel, is held in a plate 48, hinged to a transverse slide 49, which is guided in the bracket. The gage 35 is also a part of or secured to this die. The other bending-die on this side forms also the flat face 33, upon which the sheet rests, and has a lower-face left-hand bevel. The hinged plate 48 is connected by an adjustable rod 52 and a slide $52^a$ to the cam 53. On the other side of Fig. 12 the operation is reversed to turn the edge upwardly; but the construction is the same, excepting that one bending-die is the presser-foot 41, having an upper right-hand face-bevel, while the other die 54 below the sheet and having a lower face left-hand bevel is also connected in a similar manner to the cam 56. The slides 49 and 55 are operated toward and away from each other by bell-cranks 57 58, connected, respectively, to the cam 59 and to a cam formed in this instance in the gear 5, and such slides work against pressure-springs 61, so as to take up any slack motion in the connections. The slides 49 and 55 have downward projections 50, in which are threaded the adjustable stops or gages 60, which also hold the coil-springs 61 and whose heads bear against the bracket, Figs. 12 and 13, when in normal position. By adjusting these stops the width of the hooks can be altered, if desired. The operation of these parts is as follows, it being assumed that the cams are so shaped and their motions so timed as to produce the described movements: from the inoperative or idle position of Fig. 12, at which the blank is seated in position, the parts take the position of Fig. 13. First the presser-feet clamp the blank firmly. Practically simultaneously the bending-dies 47 54 are brought to bear on the sheet from above and below, respectively, and form right-angled bends in opposite directions. Immediately the slides 49 and 55 are moved inwardly, Fig. 14, completing the hooks by turning the edges inwardly against the beveled faces of, respectively, die 33 and presser-foot 41. On the return stroke the presser-foot 41 is raised until two beveled faces $41^a$ and $41^b$ come into contact, throwing the said presser-foot inwardly from beneath the upwardly-turned hook, the motion being continued by the pull of rod 44 on projection 43. All parts now return to position of Fig. 12. The next movement of the blank, with its edge hooks formed, carries it to the position in which it is curved and shaped around the forming-horn B. This movement is produced by the last pair of carriers of the series 22 by the next stroke from the position of Fig. 1. The successive blanks are received and supported upon the top of horn B and their edges upon the sliding ledges 62, movable in guides in a bracket C', extending through the frame A' and secured to the rear of bracket 32, Fig. 15. These ledges are advanced and retracted by the levers 63. The shaft 15 (which carries gear 14) has the cams 65, by which the levers 63 are operated, Figs. 3 and 15. While the sheet is on the ledges the bracket C' forms abutments to hold it from moving sidewise, and the cams are so timed that the ledges withdraw before the folding wings descend upon the blank. The cylindrical former or horn B has a central bore for the passage of the reciprocating rod 66, which will be hereinafter referred to, and is provided with upper and lower longitudinal grooves 67 68. The horn has a stub end B', which rests upon a flat bracket $80^a$ of frame A', Fig. 5, and is held there by a screw 80, passing through such bracket and into the stub. It has also the vertical recesses 69, which are a little farther apart than the length of a can-body. The folding wings D D' are hinged together upon a pin 71 in bracket C, and both are connected by hinged rods 72 73 to the oscillating arm 74. A connecting-rod 75, lever 76, (which extends forward through a slot in frame A',) and link 77 form the connections to a slide 78, directly operated by cam 79, which is the middle one of the series of seven cams on shaft 2, before referred to.

While the sheet rests on the horn and the side ledges a spring-pressed block or clamp 81, having a grooved bottom and held between guides 82 of bracket C and directly below the hinging of the wings, lies upon its upper surface at the middle. A tension on the tin from this clamp holds it back against the carriers. The block is positively spring-pressed by the equalizing-spring 83, Fig. 5, which bears above on the hinge of the wings. The bottom of this block forms two clamps, slightly curved to fit the horn. The pressure can be increased by a cam 84 on the wing D', which as the wings descend to form the body bears on the spring, and so adds additional pressure to the block. This is the position of Fig. 5 with the spring compressed and extended. The sheet is thus rigidly clamped in the middle and held, Fig. 16, and the clamp really commences to bend it. This enables the side supporting-ledges to be withdrawn without danger of the sheet being displaced. The sheet remains firmly clamped at the top until the side seam has been made and closed, Fig. 17. The connection of the wings to oscillating arm 74 is such, Fig. 3, that wing D, being connected nearer the center of oscillation, turns the outwardly-hooked edge in before the inwardly-hooked edge arrives at the meeting point, and hence such edges take the position of Fig. 16, the wings remaining in that position until the hammer also reaches the position of Fig. 16.

The seam-closing device is operated by a crank 86 on the shaft 15, Figs. 1 and 3, and is carried by a vertical slide 87, adjustably connected to the crank. It comprises the clenching-hammer, which is a block E, hinged to the slide and having the upper clenching-surface 88. (Shown in dotted lines in Fig. 15.) This surface forces the engaged hooked edges into the groove of the horn and against the solid bottom of the groove, compressing the seam in such groove and leaving the can with a smooth exterior. At each end of the hammer E is secured an upwardly-projecting plate 89, having a beveled upper side. These plates enter the recesses 69. At one side of hammer E is connected a slotted and spring-pressed beveled plate 91, which bears against the outer hook, Fig. 16.

Figure 16:
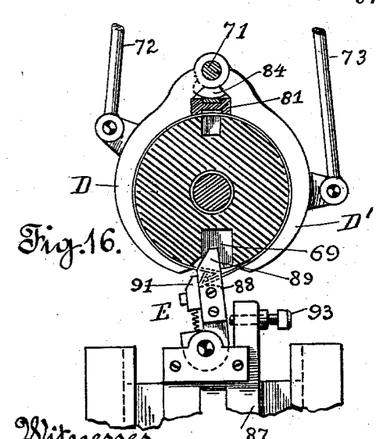
Figure 17:
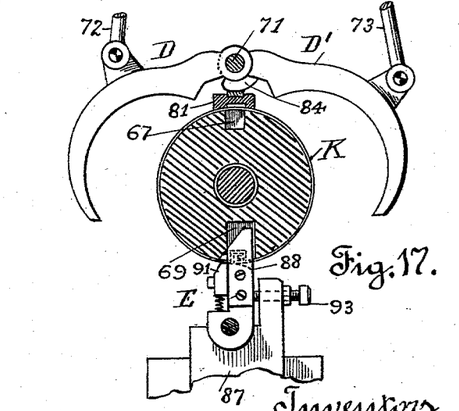

The operation of closing the seam is as follows from the position of Fig. 16: As the hammer E is pushed upwardly until it reaches such position that the hooks cannot disengage, the beveled edges of plates 89 begin to bear on the edges of the recesses 69 in the horn, the wings at this point begin to open, and the hammer is forced over into a vertical position against the adjustable stop 93. The plate 91, which is bearing against the upturned hook and which moves sidewise with the hammer, completes the interlocking of the hooks at the instant the hammer comes into the vertical position and gradually compresses the seam into and against the bottom of the groove, the spring-plate 91 yielding downwardly. The whole seam is thus within the groove, and there is therefore no superficial seam-ridge on the can-body. The wings separate and commence to rise as soon as the joint is held by the seam-closing devices, the can remaining firmly clamped at the top until after the seam has been formed and the wings reach nearly their highest position. The seam-closing devices then descend, leaving the can free on the former.

The can-body is removed from the horn by the push-rod 94, which is pivoted in the slide 17 and guided in the upper groove of the horn. A spring 17ª tends to throw its operative end up. It has a beveled face 95, which, together with its pivotal mounting, enables it to return under the blank on the horn into position to bear on the edge thereof. This push-rod working through a top groove in the horn possesses an important advantage over side carriers. If, as sometimes happens, a body-blank is too short for its edges to be interlocked, the free edges will fly away from the horn and escape side carriers and will then be mashed, together with a following body. A top carrier necessarily discharges such a defective blank.

The front end of the horn is supported against the upward thrust of the clenching-hammer by the grooved and pivoted stop 96, held down by the spring 97, and which fits in a recess in the bracket C, the latter taking the strain off the pivot. The groove in this stop permits the push-rod to pass, while the stop yields to the passage of the can-body as the latter is pushed from the horn.

Figures 5, 6, 18:
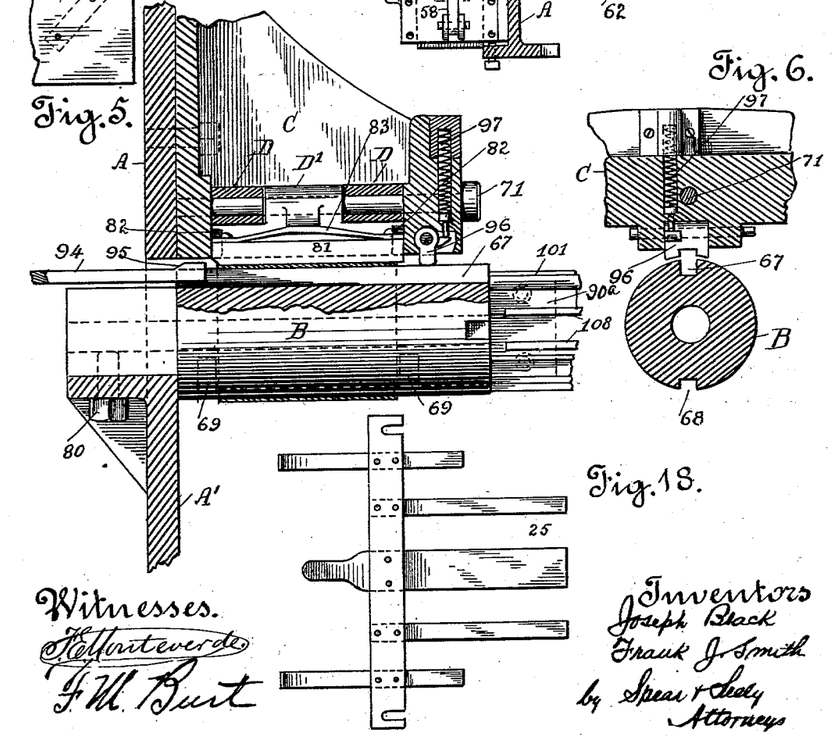
Fig. 5 is an enlarged longitudinal section showing the cylindrical forming-horn and the hinging of the folding wings.
Fig. 6 is a cross-section of the same.
Fig. 18 is a plan of the adjustable presser-plate forming part of the blank-feeding mechanism.
Figures 9, 10, 11:
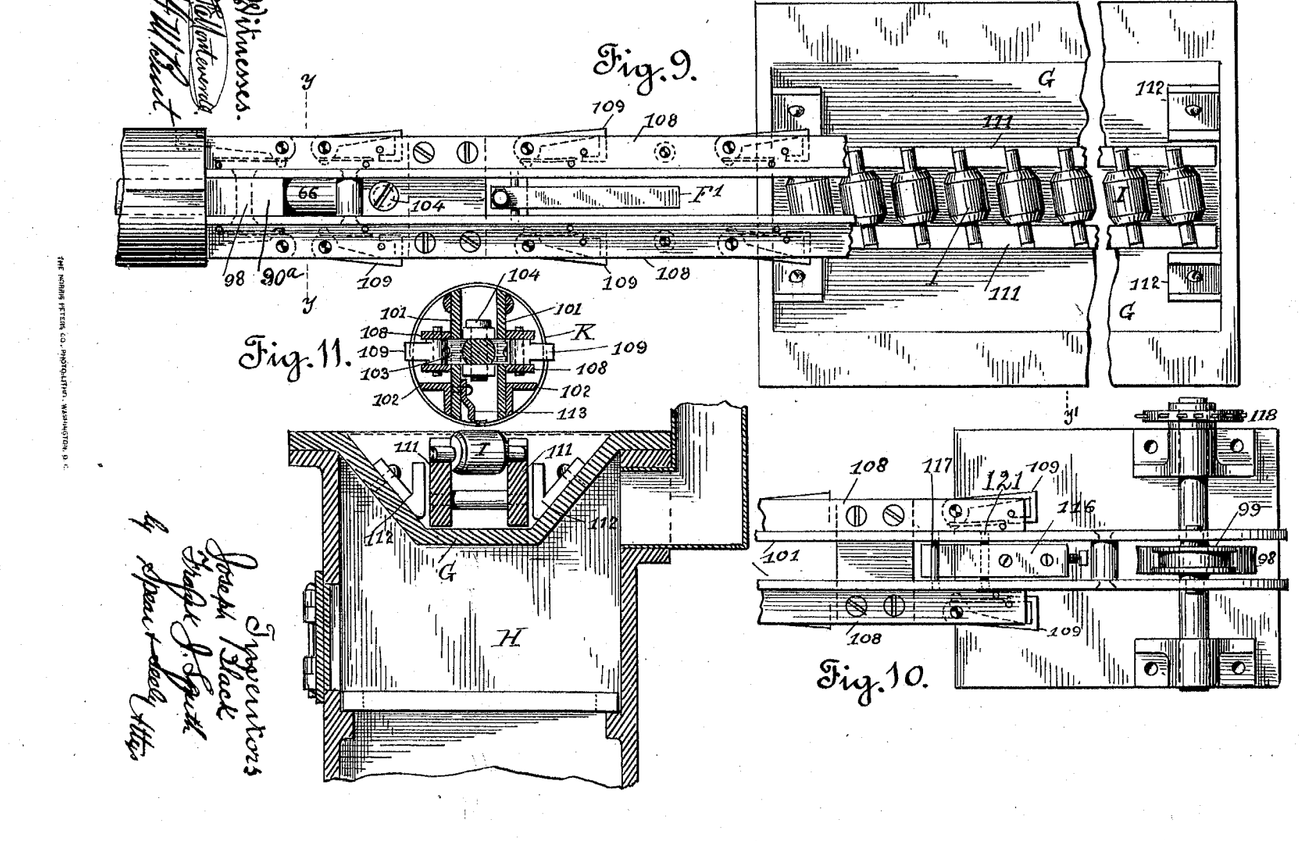
Figs. 9 and 10 taken together are a plan view of the same.
Fig. 11 is a cross-section of the horn on $y\ y$ of Fig. 9 and a cross-section of the soldering apparatus on line $y'\ y'$ of Fig. 9.

Beyond the horn the cans are guided to and over the soldering devices on a guide-frame, which forms a long extension or continuation of the horn and which is rigidly secured to the forward stub end 90ª of the latter, as by the rivets 90, Figs. 5 and 9, and is supported at the extreme rear end of the machine by the rollers 98 99. If for any reason it should be desired to remove the horn from the machine, the screw 80, Fig. 5, is taken out, which permits the whole horn and guide-frame to be removed as one structure. The machine-frame, including the horn and its guide-frame continuation, all form one rigid self-contained structure, which in practice is supported at different points by legs or standards resting on rails on the floor. The whole machine is thus bodily movable without disconnection. The cross-section of the guide-frame or continuation is shown in Fig. 11. The two parallel beams 101 have curved edges and have secured to them the angle-beams 102. A cross-head 103 is guided in slots in beams 101, and to this cross-head is connected by a pin 104 the rod 66, Fig. 1, which works in the central bore of the horn. The rod 66 is reciprocated by the oscillating lever $11^c$ through a connecting-rod 106, and its front end is formed with a slide 107, which is recessed into the slide 17. The carriers which move the can over the soldering apparatus have a shorter stroke than the carriers 22, so as to bring the can-bodies closer together and give a better exposure of the side seam to the solder, and hence the rod 106 is connected nearer the fulcrum of lever $11^c$ than is connecting-rod 19. This differential movement is permitted by the recessing of slide 17, leaving a considerable clearance, as shown, and permitting the two slides to operate independently.

Secured to the cross-head 103 and on each side of the can-supporting frame is a pair of bars 108, between which are pivoted the spring-pressed carriers 109. The first of this series project toward the forming-horn and into slots therein, so as to bear on the edge of the can-body as soon as the push-rod has completed its stroke. The others of the series extend in the opposite direction and push the can-body along step by step, being depressed beneath each following can-body on the return stroke. The can is first moved over the acid-bath F and the seam fluxed by the spring-pressed fluxing-surface F', which is a pivoted plate having a surface of some absorbent material.

Figures 7, 8:
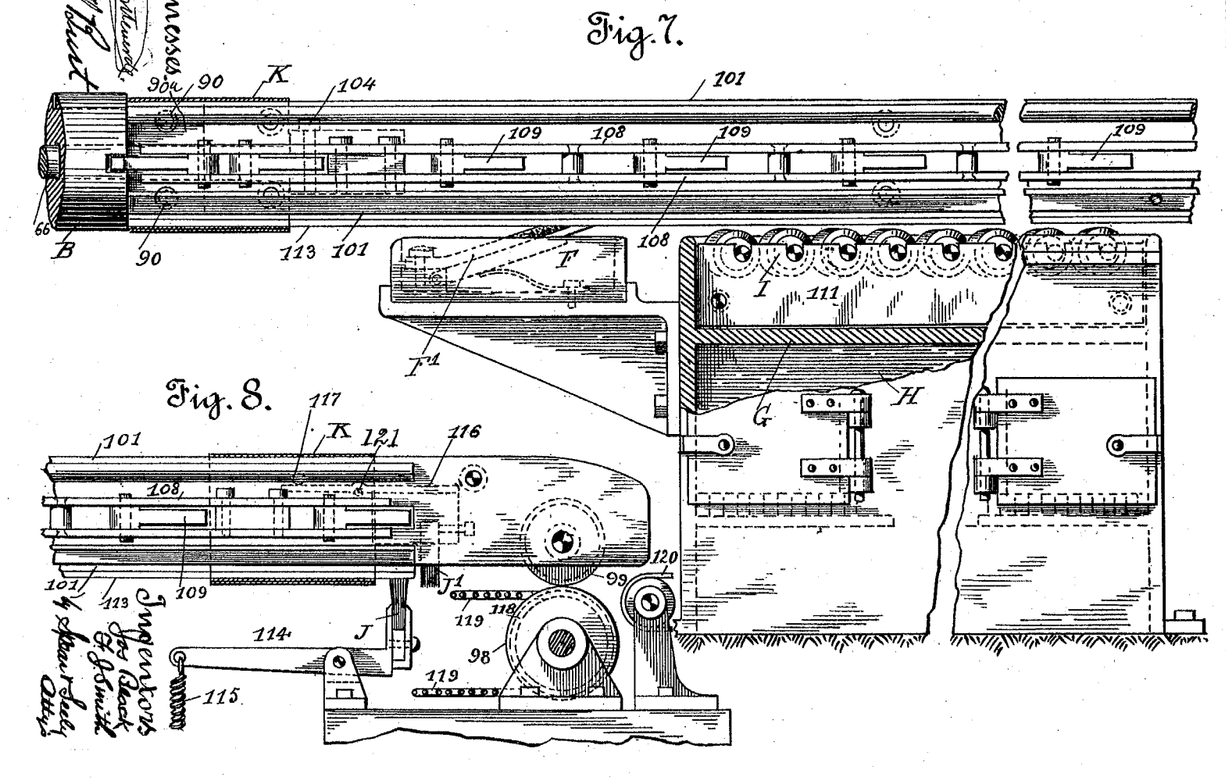
Figs. 7 and 8 taken together form a side elevation of the soldering apparatus.

The soldering apparatus comprises a tank G, having suitable heating means beneath, such as the furnace H, and containing a soldering mechanism of peculiar construction. The tank G is a trough having downwardly-converging walls, Fig. 11, in which a sufficient quantity of solder is maintained in a melted state. The solder-applying device is a structure or frame consisting of the two parallel bars 111, connected by rivets and having in their upper edges oblique bearings for the journals of the horizontal rollers I, of which there are a series extending throughout the length of the trough and all equally inclined to its longitudinal line. The frame 111 is loose in the trough between angle-guides 112 and floats in the solder, with the rollers projecting slightly above the surface and in the line of the horn and of the can-seam, which moves over their upper surfaces in contact. The can-body passing over the flux-bath and soldering-rollers is held in line by the single guide-strip 113, secured within the skeleton horn, Fig. 11. The edge of the seam within the can bears against this guide, which extends the full length of the soldering devices, and so keeps the seam in proper place for a perfect contact with the rollers. The latter being inclined tend to turn the can-body on the horn, and this tendency holds the seam up against the guide-strip and absolutely insures the correct presentation of the seam to the rollers. An important advantage results from this construction. In ordinary practice two guide-strips, one bearing on each side of the seam, are required to keep the can-body in position during the soldering operation. In the vacant spaces between cans both guides take up solder and then apply it to both sides of the seam. Of course all solder applied to one side is wasted, while that applied on the other side is effective. Hence by inclining the rollers only one guide-strip is required, and the solder taken up by that strip is used in the joint. After leaving the soldering-tank the seam is carried in contact with inside and outside wipers J J'. Wiper J is a brush of any suitable material mounted in a lever 114, held up against the seam by a spring 115, so that as the brush wears it is always maintained in contact with the seam of the can-body. Wiper J' is a similar or suitable brush mounted in a block 116, pivoted on a pin 121 within the horn and having a projecting arm adapted to bear against a stop 117. The weight of the block keeps the brush in the path of the seam and makes it automatically adjustable for wear. The can-body is now ready to be discharged. For the final discharge of the can-body we make use of the rollers 98 and 99, which support the extreme rear end of the guide. The supporting-roller 98 is journaled in bearings in a suitable bed-plate and is positively driven in the proper direction by the sprocket 118, which is driven by the sprocket-chain 119, extending to a sprocket $119^a$ on the shaft 15. The supported roller 99 is journaled between the bars of the guide-frame and has a grooved periphery, Fig. 10, to accommodate the side seam. The carriers push the can-body to a point where it can be seized by the two rollers drawn positively through and discharged onto a cooling belt or carrier 120, Fig. 8, to afford sufficient time for the solder to properly set.

It must be understood that by changing the cross-section of the horn to square and using correspondingly-shaped folding wings and a guide-frame of similar cross-section the machine can be used to produce square instead of round can-bodies.

It will be understood that the adjustment before referred to of brackets 20 and 32 and of the cams on shaft 2, which operate the hook-forming devices and which are keyed to said shaft, as shown, are to enable cans of different diameters to be formed, different horns and folding wings being used for different sizes.

Having thus fully described our invention, what we claim as new, and desire to secure by Letters Patent, is—

1. In a can-body machine, carriers for feeding blanks, and carriers for feeding can-bodies, the said last-named carriers having a shorter stroke than the blank-feeding carriers, and means for accomplishing the differential strokes of said carriers.

2. In a can-body machine, the frame of the machine, a reciprocating slide guided in said frame, a series of blank-feeding carriers connected to said slide, a second slide guided in said frame, a series of can-body-feeding carriers connected to said second slide, an oscillating arm having independent connections to said slides, the connection to said second slide being set relatively near the fulcrum of said arm; whereby said series of carriers derive differential strokes.

3. In a can-body machine, the frame of the machine, a reciprocating recessed slide guided in said frame, a series of blank-feeding carriers connected to said slide, a second slide guided in said frame, a series of can-body-feeding carriers connected to said second slide, an oscillating arm having independent connections to said slides; whereby they derive a differential stroke, the recess in the first slide acting as a clearance for the second slide.

4. In a can-body machine, the main frame having a feed-table for blanks, a slide guided in said main frame, carriers connected to said slide by which the body-blanks are delivered to the edge-bending mechanism and to the horn, a horn having a longitudinal groove at the top, and a push-bar pivoted in said slide and working in said longitudinal groove for removing the can-body from said horn.

5. In a can-body machine, the combination with the horn having a longitudinal upper groove, of a pivoted push-bar working in said groove and having a head provided with a rear incline; whereby said bar is permitted to yield and pass back through a can-body on the horn, and afterward to bear against the edge of said can-body, and push it from the horn.

6. In a hook-forming mechanism of a can-body machine, an anvil for supporting one edge of the body-blank, a vertical slide above said anvil, a presser-foot hinged to said slide, and provided with a spring which tends to hold it in line with said slide, and opposing inclines for positively throwing said presser-foot out of line as it rises over said anvil.

7. In hook-bending mechanism, rigid anvils for supporting body-blanks during the bending operation, presser-feet adapted to clamp said body-blanks upon said anvils, means for operating said presser-feet, and connections which include relieving-springs, between said presser-feet and said operating means, substantially as and for the purpose set forth.

8. In a can-body machine, the slotted upward extension A' of the main frame, in combination with a shaft having two series of cams for operating the hook-forming mechanism, a cam on said shaft intermediate between said series, a horn, hinged folding wings above the horn, and connections extending through said extension for operating the folding wings from said intermediate cam.

9. In a can-body machine, a vertical standard of the main frame, a shaft journaled therein, a cam centrally located on said shaft, a vertical slide on the same side of the said standard as said cam and connected to said cam, an oscillating lever linked to said slide and projecting back through a slot in the main frame, a horn, folding wings above the horn, and connections between said oscillating lever and said folding wings.

10. In a can-body machine, the combination with the horn, and with folding wings hinged together above the same, of a block or clamp beneath the folding wings and adapted to clamp a blank upon the horn at the top, and a leaf-spring bearing upon the upper surface of said block at its ends for forcing said block downwardly with an equalized pressure.

11. In a can-body machine, the combination with the horn, and with folding wings hinged together above the same, of a block or clamp beneath the folding wings and adapted to clamp a blank upon the horn at the top, a spring for forcing said block downwardly, and a cam on a folding wing for increasing the pressure of the spring.

12. In a can-body machine, the combination with the horn and with folding wings hinged together above the same, of a block or clamp located beneath the folding wings, and recessed so as to provide two contact-surfaces, and means for forcing said block or clamp toward the horn; whereby the blank upon the horn is clamped on both sides of its central longitudinal line.

13. In a can-body machine, the combination with a horn having a longitudinal groove in its upper surface, and a push-bar operating in said groove, of a clamping-block grooved so as to provide two separate contact-surfaces, and so as also to permit the passage of said push-bar, and means for forcing said block toward the horn.

14. In a can-body machine, the combination with the horn and with folding wings for bending blanks around said horn, of a vertically-movable slide and a clenching-hammer pivoted to said slide and provided with means for drawing the blank in toward the horn by a sidewise movement.

15. In a can-body machine, the combination with the horn and the folding wings, of a pivoted clenching-hammer normally out of line with the vertical slide to which it is connected, and means carried by the horn which, upon contact with said hammer, cause it to move into line with its slide, and thereby draw the sheet in toward the horn.

16. In a can-body machine, the combination with the horn, provided with the recesses 69, of a vertical slide, a clenching-hammer pivoted thereto, and having beveled projections adapted to enter said recesses, and thereby bring the hammer into line with said slide, substantially as and for the purpose set forth.

17. In a can-body machine, the combination with the horn and with the folding wings, of a pivoted clenching-hammer, a yielding block carried thereby, and against which one edge of the body-blank bears previous to compression, and means carried by the horn for forcing said hammer and block sidewise so as to draw the blank in toward the horn.

18. In a can-body machine, the combination with the horn and with the seam-closing mechanism, of a pivoted and spring-pressed thrust-block bearing on the horn opposite the seam-closing mechanism, and adapted to yield to permit the passage of can-bodies along the horn after the seam-closing operation.

19. In a can-body machine, a guide-frame, a soldering mechanism located beneath said frame and comprising a series of inclined idle rollers, revolved by contact with the moving can-body in the same direction and means for supplying solder thereto, and a single seam-guide within said frame against which the seam is held by said rollers.

20. In a can-body machine, a soldering device comprising a solder-trough, oblique idle rollers journaled therein, and revolved by contact with moving can-bodies in the same direction and means for causing can-bodies to pass in contact with said rollers.

In testimony whereof we have affixed our signatures, in presence of two witnesses, this 29th day of March, 1902.

JOSEPH BLACK.
FRANK J. SMITH.

Witnesses:
HARRY L. HORN,
E. GREENBAUM.